No. 633,218. Patented Sept. 19, 1899.
F. H. RICHARDS.
WEIGHING MACHINE.
(Application filed Nov. 28, 1898.)
(No Model.) 6 Sheets—Sheet 1.

Fig. 1.

Witnesses.
A. B. Mattingly
R. W. Pittman

Inventor.
F. H. Richards

Fig. 3.

No. 633,218. Patented Sept. 19, 1899.
F. H. RICHARDS.
WEIGHING MACHINE.
(Application filed Nov. 28, 1898.)

(No Model.) 6 Sheets—Sheet 4.

Fig. 4.

Witnesses.
A. B. Mattingly
R. W. Pittman

Inventor.
F. H. Richards

No. 633,218. Patented Sept. 19, 1899.
F. H. RICHARDS.
WEIGHING MACHINE.
(Application filed Nov. 28, 1898.)
(No Model.) 6 Sheets—Sheet 5.

Fig. 5.

Witnesses. Inventor:
A. B. Mattingly. F. H. Richards.
R. W. Pittman.

Fig. 6.

UNITED STATES PATENT OFFICE.

FRANCIS H. RICHARDS, OF HARTFORD, CONNECTICUT.

WEIGHING-MACHINE.

SPECIFICATION forming part of Letters Patent No. 633,218, dated September 19, 1899.

Application filed November 28, 1898. Serial No. 697,632. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, and more particularly to that class thereof designated as "rising-poise" weighing-machines.

An object of the invention is to provide a weighing-machine embodying an improved load-reducing instrumentality or means.

A further object of the invention is to provide a weighing instrumentality or mechanism operative to weigh magnetizable or ferruginous material and in connection therewith an improved load-reducing means comprehending magnetic means adapted to reduce or discharge such material by attraction, thereby to remove or withdraw the same from the weighing mechanism and reduce the load.

In the drawings accompanying and forming part of this specification, Figure 1, which illustrates this invention by one form of mechanism, is a front view of a weighing-machine constructed in accordance with this invention, said view being partly in dotted lines.

Similar characters designate like parts in all the figures of the drawings.

As a preface to a further description of this improved rising-poise weighing-machine it is to be understood that the various details herein shown and described may be more or less varied without departure from the general scope of the invention. For instance, various stream-controlling or load-discharging means may be adapted for use in connection with the other mechanisms shown and described or with the improved load-reducing means, since the invention more particularly comprehends a load-reducing device, instrumentality, or means involving the use of electricity or a load-reducing means which is capable of attracting or separating one part of the material from another part thereof, thereby to reduce the load, or a load-reducing device adjustable toward and from the material. Furthermore, it will be seen that the load-reducing means may be thrown into and out of action at any desired stage in the operation of the machine by merely changing the time of operation thereof, and hence the load-reducing means may operate simultaneously with the whole or a part of the supply of material to the load-receiver, if found desirable— as, for instance, the amount of reduction may be somewhat less than the amount of supply, so that a gradual making up of the overload is obtained, or after a certain proportion of the material has been supplied to the receiver the reduction may be somewhat greater than the supply, whereby the load is gradually brought to a poise; but for the present purposes the load-reducing means will be described as operative after the overload has been completely supplied and the further supply to the weighing mechanism cut off.

In the present form of machine the stream-controlling means, weighing mechanism, and load-discharging means, together with the subordinate mechanisms, (excepting the load-reducing means, and also excepting a somewhat different construction of load-receiver,) are substantially similar to my application heretofore filed September 9, 1898, Serial No. 690,574, in which application the use of a blast is involved in the load-reducing means. As stated in said application, in all my prior rising-poise patents, including my first patent, No. 572,067, dated November 24, 1896, the overload or amount of material supplied to the receiver has been usually reduced by means directly operative on the material and while in the receiver.

In the present instance, like the apparatus set forth in the application above referred to, the load-reducing means is effective on the material after it has been completely transferred or discharged from the weighing mechanism or the receiver thereof and while it is in a neutral space or region or a field of non-influence, and is consequently without influence on such weighing mechanism. In my said case involving the use of a blast the load-reducing means is operative to force the material from the load-receiver and is shown disposed at the inner side of the stream to accomplish this purpose; but in the present instance in the form shown (which, however, may be widely varied) the load-reducing means is operative to attract or withdraw the material from the load-receiver and is shown disposed in the present form of machine at the outer side not only of the receiver, but of the continuous stream.

The present construction of weighing-machine is particularly adapted for the weighing of magnetizable or ferruginous material—that is, material which can be attracted by magnetism, one instance of which is iron ore—and in connection with such machine I have shown an improved load-reducing means adapted to separate, for the purpose of weighing, one portion of the material from another, and which load-reducing means in the present form thereof is shown as a magnetic load-reducing means. I also desire to state that the machine in some forms thereof could be used not only as a weighing-machine, but also as a material-separating machine, and hence could be used not only to weigh material which is more or less magnetizable throughout, but also to separate that part of the material which is magnetizable or ferruginous from that portion thereof which is non-magnetizable or non-ferruginous, so that during the process of weighing the free and ready separation of the different ingredients could be readily obtained, while the weight of the magnetizable material could be readily ascertained by a separate machine into which such material might flow or by the previous weighing of the material in bulk, whereby after the separation of the magnetizable ingredients the weight of the remainder could be ascertained, thereby indicating the weight of the separated magnetizable material.

This improved machine comprises in a general way in the form herein shown and described and which may be considered its preferred form, if desired, weighing or poising mechanism comprising a load-receiver of any suitable construction adapted for the purpose and counterbalancing means, overload-supply means involving the use of stream-controlling means, such as valve mechanism, and load-discharging means, in connection with which mechanisms is embodied this improved form of load-reducing means (designated in a general way by A) involving the use of electricity.

The framework for supporting the operative mechanisms may be of any suitable character, but in the present instance it is shown comprising a base 2, having a pair of uprights or side frames 3 and 4, each of which is shown in this instance as respectively comprising a pair of members 3' and 3" and 4' and 4", and which side frames are united at their upper ends by a top plate 5, shown carrying the material-supply means, such as a chute 6, of any suitable construction.

The weighing mechanism in the form shown comprises a suitable load-receiver 100 and counterbalancing means 150, substantially similar to that shown in many of my prior patents. This load-receiver in the present instance is maintained against undue lateral play or movement by a linkage connection with the hopper, and which connection is shown comprising a pair of arms 17, secured to the receiver and connected by pivoted links 18 with the hopper at the sides thereof. The receiver is provided with a supplemental compartment, shown in the nature of a hopper, so that the receiver comprises a main compartment $a$ and a supplemental compartment $b$, one wall of the receiver being provided with an opening $c$, adjacent to and immediately below the discharge-mouth $b'$ of the supplemental compartment or hopper. This hopper is provided with an apron or wall $b''$, disposed in such position that a portion of the material during the supply thereof to the receiver will be separated from the main compartment $a$ and flow into said hopper $b$ and be discharged therefrom at the mouth $b'$, preferably in a steady and continuous stream, and hence past said opening $c$, which may be of any desired area adapted for the purpose for which it is designed; but in the present instance the opening $c$ is of sufficient area to permit of the ready deflection of the stream from a continuous, depending, or vertical stream into an oblique or diverted stream, whereby it will be led or attracted from the inner side of said receiver to the outer side thereof by the improved load-reducing means hereinafter described. For the purpose of completely separating the material discharged from said hopper from the main body of the material, thereby to permit it to pass through a neutral space or field of non-influence, a conduit $d$ is shown at one side of the load-receiver, the upper end of which preferably surrounds or incloses the discharge-mouth $b'$ of the supplemental compartment or hopper $b$, the lower end thereof leading to a point adjacent to the main discharge-mouth of the load-receiver. The inner wall $d'$, together with the side walls of this conduit, thus forms a partition between the main compartment and the outer wall of the load-receiver, so that at that part of the receiver adjacent to the opening $c$ thereof there is formed a neutral space or field of non-influence $e$, whereby when the material is within such field of non-influence and is passing through such space it is without influence on the weighing mechanism to effect the movement thereof.

The load-receiver is provided with load-discharging means, shown in the present instance comprising a closer operative at the main discharge end of the receiver. In the form shown this closer comprises a weighted oscillatory member 8, pivotally secured to the load-receiver, suitable means being provided for maintaining the same shut or closed. This means in the form shown comprises a weighted catch or locker-arm 9, pivotally secured to one part of the load-receiver and having a catch-face 10' operative to engage an arm 8', carried by the closer 8, thereby to maintain said closer shut. The movement of this catch-arm is limited by a stop 13, disposed intermediate a pair of stop-arms 12 and 12', projecting from the hub of the catch-arm, whereby such closer-catch will be maintained in operative position. This locker-arm 9 is also provided with an arm 14 in position to be engaged by a weighted by-pass 15, carried by one of the side frame members, as 3'', and maintained in operative position by a stop 16. When the receiver descends with its overload, the catch descends therewith and carries its arm 14 into position below the by-pass 15, Fig. 4, whereupon when the receiver ascends to its poise position with its true load said arm 14 is in position to be engaged by such by-pass, whereby it will be oscillated, the closer released, and the discharge of the true load effected, such catch-arm 14 being released from the by-pass 15 when the receiver ascends to its normal position by the continued upward movement of said receiver.

The stream-controlling means in the form shown comprises an oscillatory valve 20 of any suitable construction, having its arms 21 pivotally secured one at each side of the supply-chute 6, and which supply-valve is controlled by the weighing mechanism through the medium of the load-receiver, and for this purpose said receiver is provided with a pair of valve-operating arms 22, one at each side of said receiver and operative to engage a pair of projections 23, one carried by each of said valve-arms 21. For the purpose of preventing the downward movement of the receiver until an overload is assured—that is to say, to prevent the weight of the valve which is in engagement with the operating-arms 22 of the receiver from forcing said load-receiver down after a part of the load has been supplied and before an overload is assured—suitable means is provided, and in the present instance one of the valve-arms is provided with a friction-roll 24 in position to engage a weighted cam device 25, pivotally secured to the supply-chute and maintained in position by a suitable adjustable weight 26 and a stop 27. This cam device is provided with two cam-surfaces 25' and 25'', so that when the load-receiver is in its normal position and until a certain amount of material has been received thereby, usually an overload, the cam device has one of its surfaces 25' in engagement with the friction-roll 24 of the oscillatory arm of the valve, thereby to assist in maintaining the valve open, whereby the weight of the valve is prevented from forcing the load-receiver down prematurely and until an overload is assured. When the load-receiver descends with its overload, it carries its valve-operating arms 22 downward, whereupon the friction-roll 24 of the valve-arm operates to lift the weight of the cam device 25, which permits the valve gradually to cut off the load, at which time the cam-surface 25'' comes into engagement with the valve-arm and assists in maintaining the valve closed. On the return movement of the load-receiver to its normal load-receiving position the valve is opened by the means hereinbefore described, the friction-roll lifting the weighted cam device 25, which is shifted into position to have its cam-face 25'' engage the valve-arm, as above set forth.

Figure 1:
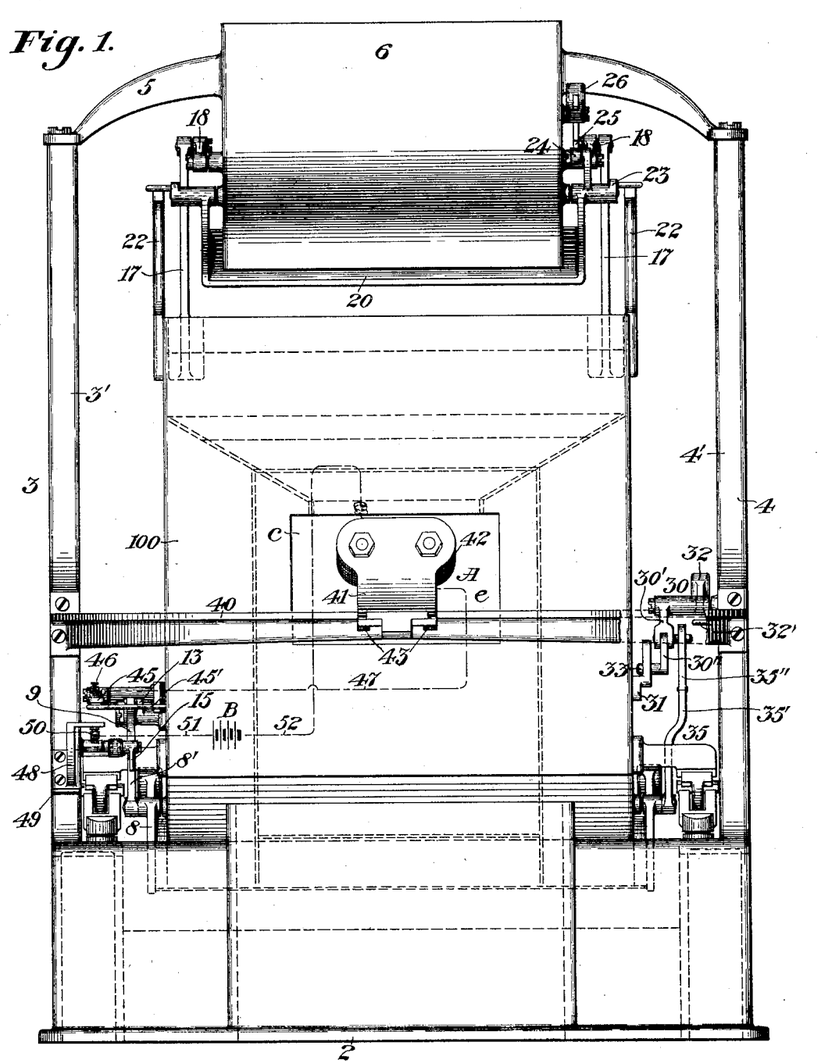
Figure 2:
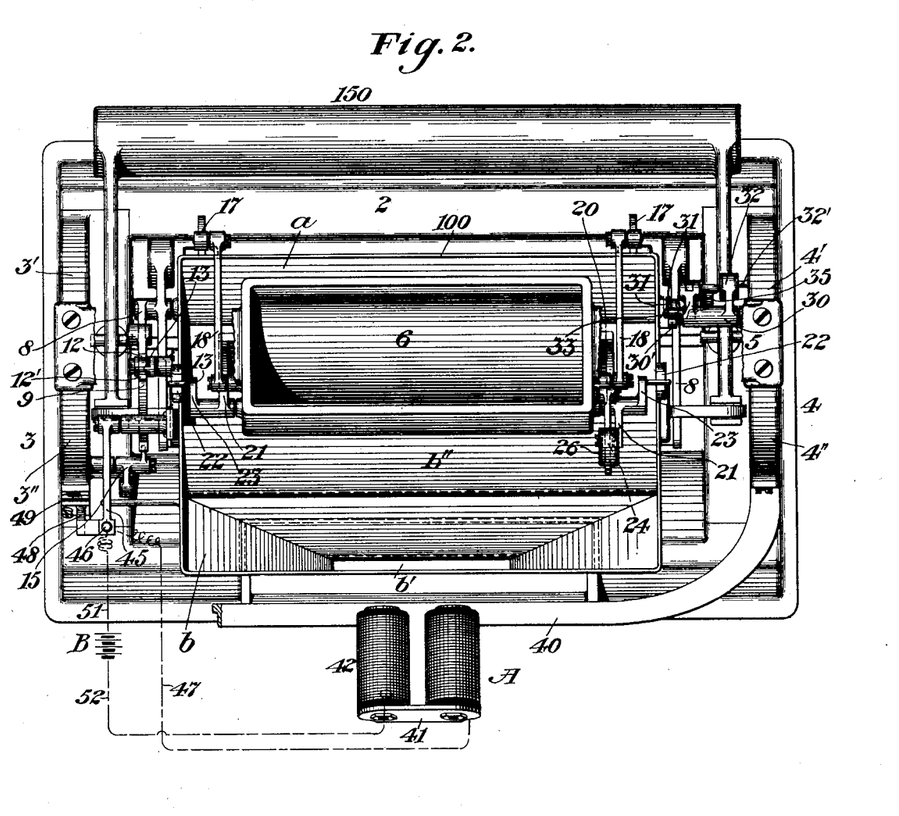
Fig. 2 is a top view thereof.
Figure 3:
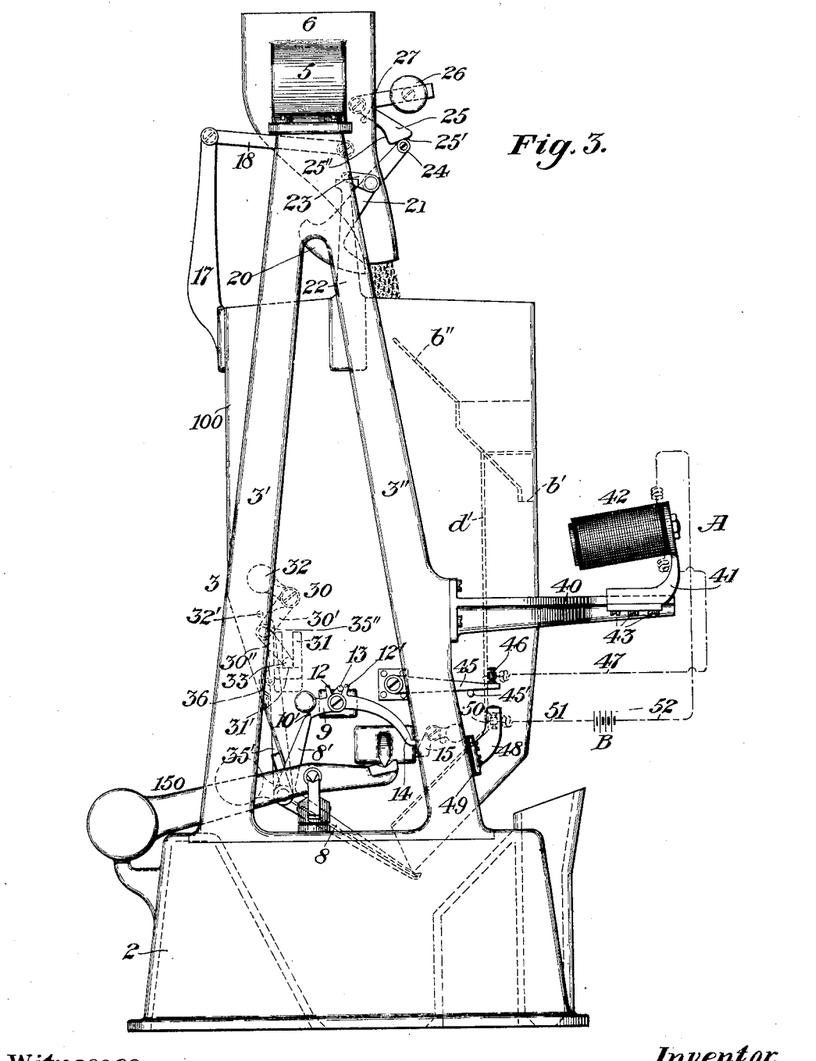
Figs. 3, 4, 5, and 6 are left-hand side elevations with parts thereof in section, Figs. 4 and 6 having parts thereof broken away to more clearly illustrate the operation of the machine, Fig. 3 illustrating the overload-supply period, Fig. 4 the commencement of the load-reducing period, Fig. 5 a successive step during the load-reducing period, and Fig. 6 the load-discharging period succeeding the load-reduction and the obtainment of the true load determined by the poising of the weighing or poising mechanism.

Since in this improved organization of mechanism the stream-controlling means is controlled by the weighing mechanism on the descent and ascent thereof, it follows that after the load-receiver has reached its poise position with its true load and is commencing its main discharge the tendency of the receiver is to return to its load-receiving position, and thereby open the valve and permit an additional stream of material to be supplied to the receiver at this time, which will be added to the true load already obtained. Therefore to prevent the opening of the valve, except at the proper predetermined period, suitable means is provided, (designated herein as "limiting" means,) since it permits the free downward movement of the receiver and the upward movement thereof to its poising position and also the return of such receiver to its load-receiving position after the load has been completely discharged, but limits the upward movement thereof from its poise to its load-receiving position, during which period the valve is opened until after the complete discharge of the true load. In the present structure this means, which is shown operative to lock the receiver, and thereby the weighing mechanism against upward movement during a predetermined period, and so prevent the opening of the valve, involves toggle mechanism comprising a toggle member 30 and a working member 31 coöperative therewith, one carried by the framework and the other by the receiver, and in the preferred construction this toggle member 30 comprises a pair of toggle-levers 30' and 30'', pivotally secured to one of the side frame members, as 4', and a weight 32, the movement of the weight in one direction being limited by a suitable stop 32'. The lower end of one of the toggle-levers, as 30'', is provided with a laterally-extending arm 33 in operative engagement with the working member 31, carried by the load-receiver. This member 31 is shown as a bifurcated device, in the furcated part of which the toggle-arm 33 is carried when the load-receiver is in its load-receiving position, whereby the toggle-levers are maintained in their position, substantially as shown in Fig.

Figure 4:
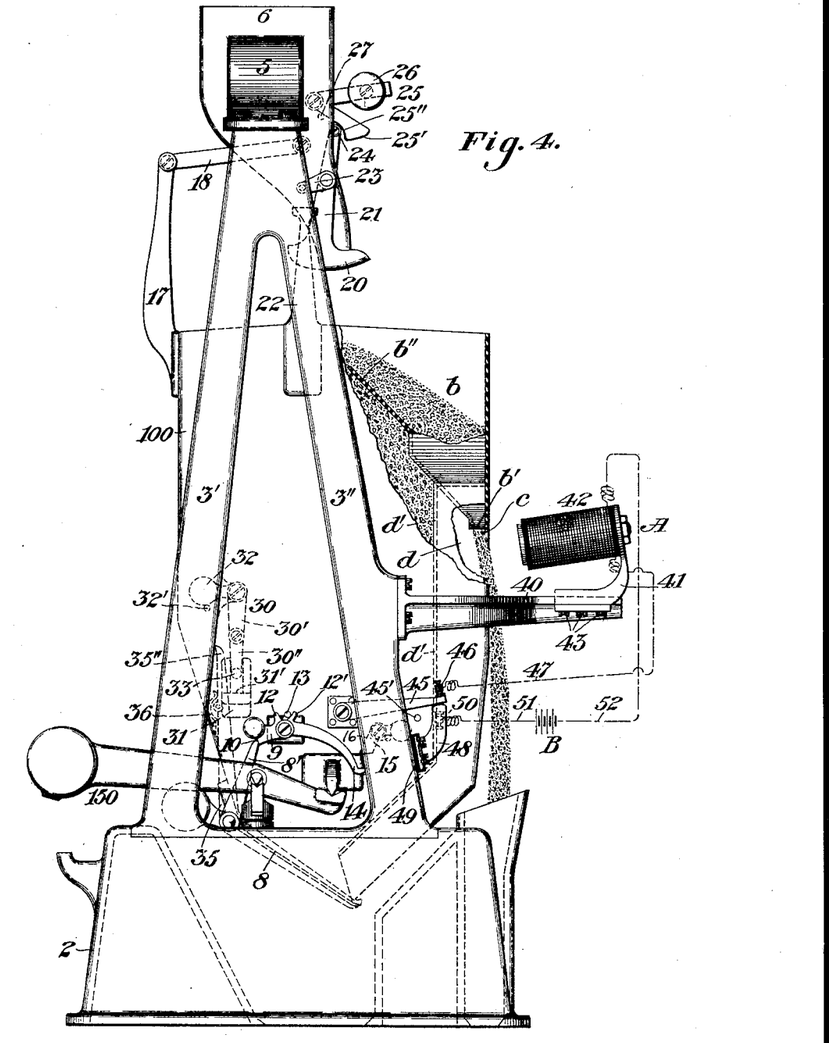
Figure 5:
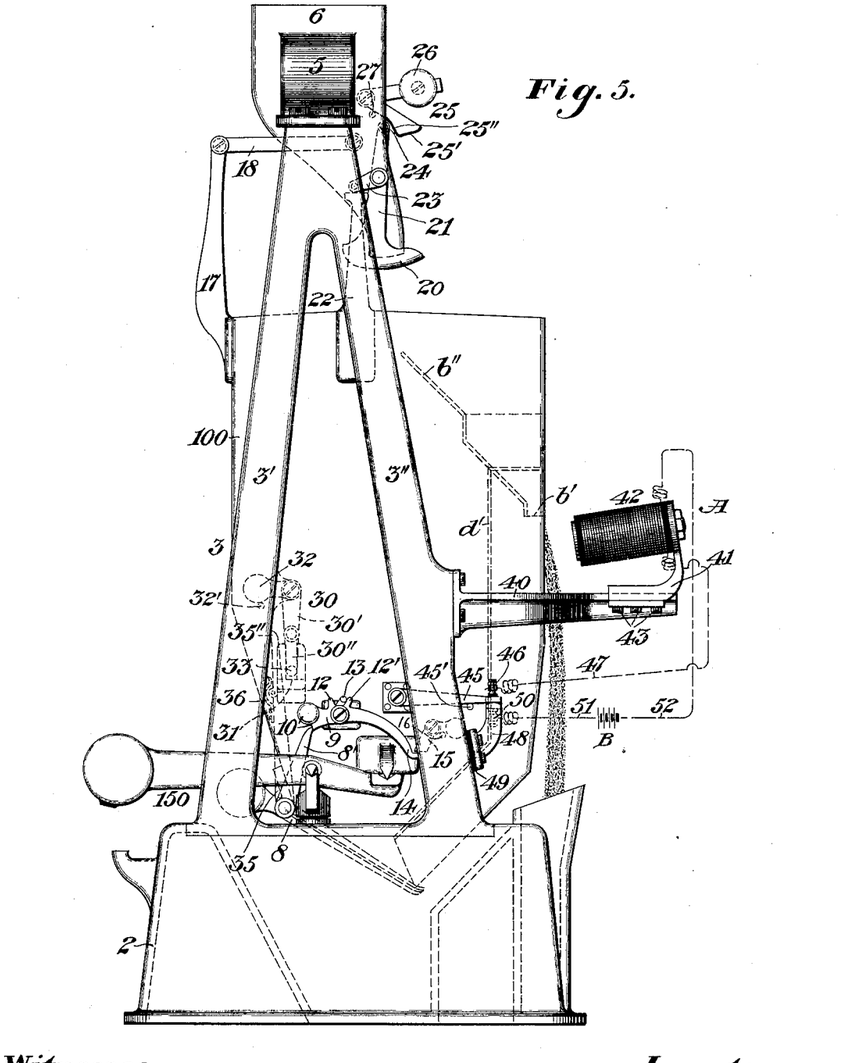
Figure 6:
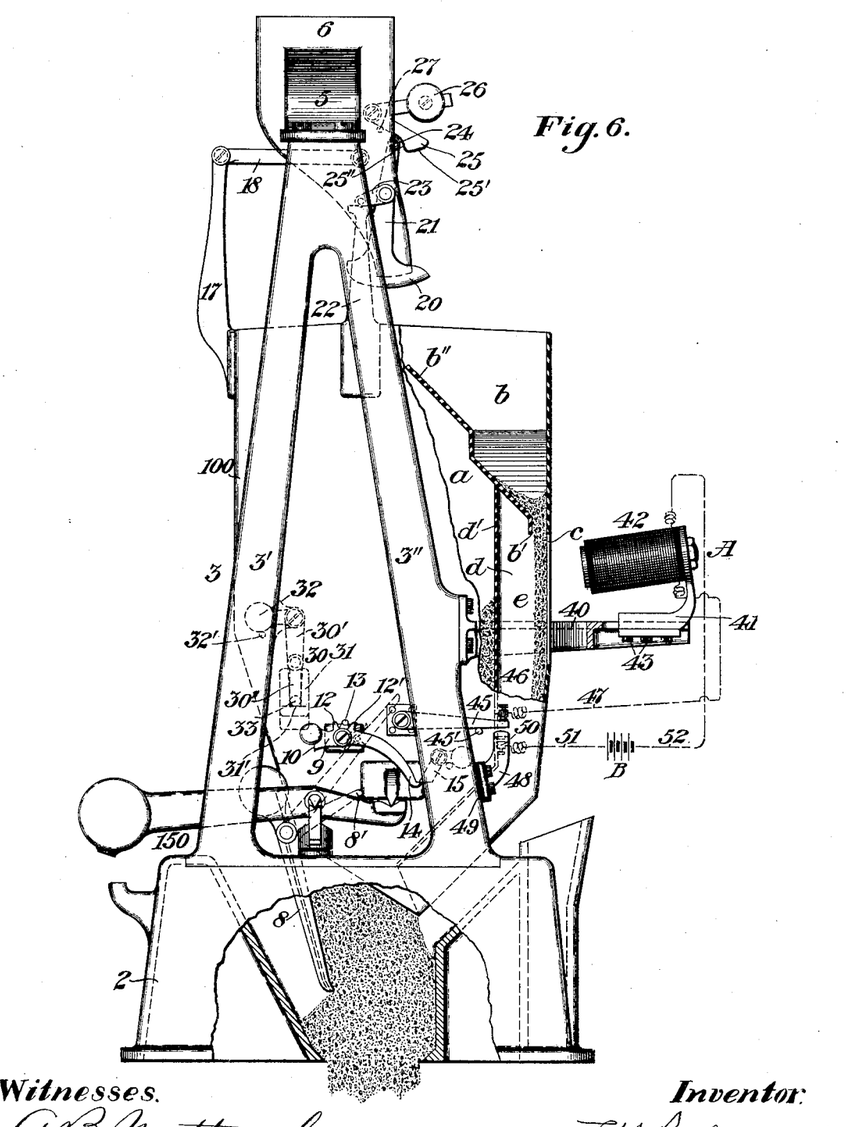

3. On the descent of the load-receiver with an overload the bifurcated member 31 descends therewith, thereby permitting the weight 32 to operate the toggle-levers and throw the same into alinement, substantially as shown in Fig. 4, so that when the true load has been partially discharged and the receiver commences to move upward above the position of poise the toggle-arm 33 engages the lower wall 31' of the bifurcated member 31, which thus acts as a stop and prevents such movement of the load-receiver, so that the opening of the valve is prevented. It will be understood, of course, that there is sufficient play between the bifurcated member 31 and the toggle member 30, so as not to interfere with the proper poising of the weighing mechanism. To permit the load-receiver to return to its load-receiving position after the load has been completely discharged, suitable means is provided for operating this toggle mechanism so as to unlock the load-receiver and permit the ascent thereof, and in the present instance this means comprises a suitable catch-arm 35, operatively connected to the closer, so that the toggle mechanism, which limits the movement of the load-receiver at one period, is in turn controlled by such load-receiver constituting a part of the weighing or poising mechanism through the medium of its closer. This arm 35 is shown comprising a pair of pivotally-connected members 35' and 35", one of which is maintained in position relatively to the other by a suitable spring 36. In operation when the load-receiver is in its load-receiving position the limiter-actuating arm 35 is substantially in the position indicated in Fig. 3, while the toggle-levers 30' and 30" are in their angular positions. On the descent of the load-receiver with its load this arm 35 is carried downwardly therewith, while the toggle-levers shift into alinement, Fig. 4, so that on the return of the load-receiver to its poising position and on the opening of the closer such closer shifts this actuating-arm 35 past the projection 33, carried by the toggle-levers, this being permitted owing to the pivotal connection between the members 35' and 35" of such arm, the member 35" being returned to its normal position by the spring 36 after it has passed the toggle members. On the shutting of the closer, the material maintaining it open until all appreciable amount thereof has been discharged, the actuating-arm is shifted upward, whereby it engages the projection 33 of the toggle-levers and forces the same into their angular position, substantially as shown in dotted lines in Fig. 3, thereby disengaging the same from the bifurcated member 31 of the load-receiver and permitting said receiver to ascend to its normal position, during which movement it opens the supply-valve in the manner above set forth to permit a succeeding load to be received by the weighing mechanism.

As before stated, this weighing-machine involves an improved load-reducing means operative to effect the reduction of the load at the proper predetermined period, thereby to secure a proper and true load by a rising poise, whereby the weighing mechanism is not affected by the impact of the material supplied thereto or by the momentum of the operating parts. To reduce the load, an improved means is provided suitably supported in position for this purpose. In the present instance this means is shown involving electricity as the direct agency for effecting the load reduction and which agency is shown in the present structure in magnetic form—such, for instance, as an electromagnet of some suitable form and construction in position to effect the desired result. In the structure shown this electromagnet is supported by the framework of the machine, and for this purpose a projecting arm 40 is provided, shown herein in the form of a slideway, on which is secured a sliding bracket 41, carrying a magnet 42. This bracket 41 may be adjustably secured in position by some suitable means, but in the present form thereof is shown so secured in position by screws 43. By this means of support the magnet can be adjusted toward and from the material and the load-receiver, whereby it can be disposed in such position that it will exert sufficient power to attract or deflect the stream flowing from the supplemental compartment or hopper $b$ from its normal depending or vertical flow into an oblique or divergent flow, and hence through the opening $c$ to the outside of the receiver 100, whereupon it will flow from the load-receiver into the supplemental chute hereinafter described, but will not be of sufficient power to draw the material into contact with the magnet. This magnet is connected with a suitable battery B through the medium of a circuit-controller. In the present instance this circuit-controller comprises a device carried by the weighing mechanism, shown herein carried by the load-receiver. This device is shown as a shiftable controller, such as arm 45, pivotally secured at one end to the load-receiver, the opposite end of which is provided with a binding-post 46 for one wire 47 of the circuit, and which wire 47 leads to the magnet. A suitable stop 45' limits the swinging movement of this arm. Fixedly secured to the framework (shown as the side frame member 3") is an arm 48, insulated from said side frame member by suitable insulating material 49, and which arm carries a binding-post 50 for the other wire 51 of the circuit, which wire 51 leads to the battery B, and from which battery a wire 52 leads to the magnet, whereby when the shiftable arm 45 is in contact with said fixed arm 48 the magnet will be energized or magnetized, and when said arm is out of contact, Fig. 3, the magnet will be demagnetized.

The operation of this improved weighing-machine when constructed substantially in the manner shown and described is as follows: The supply-valve being open and the receiver in its normal load-receiving position, the material is supplied to the load-receiver, the main part thereof entering the main compartment $a$, while a part thereof flows into the supplemental hopper $b$, from which it flows in a continuous stream through the neutral region $e$, from which point if its flow was uninterrupted it would return to the load-receiver, so that such stream does not of itself reduce the load, since if left uninterrupted it would return to the load-receiver to again form a part of the overload. After the overload has been secured the descent of the load-receiver permits the supply-valve to cut off the supply of material to the receiver, said descent operating to carry the load-reducing controller 45 into contact with the fixed arm 48, whereby a circuit is formed and the magnet magnetized, whereupon the reduction of the load takes place. This reduction is accomplished by the magnetic action of the magnet, which attracts the magnetizable or ferruginous material or ingredients during its passage by the opening $c$, thereby deflecting the same from the neutral space $e$ and withdrawing it from the load-receiver and permitting it to be received by any suitable means, (shown herein as a conduit or receptacle 55,) but which, however, may be a suitable reconveying means similar, if desired, to that shown in my prior application, hereinbefore referred to. When the reduction has been continued sufficiently long, the load-receiver will rise to a poising position, thereby carrying the shiftable controller 45 out of contact with the arm 48, whereby the circuit is broken and the reduction ceases on the poising of the load. On the poising of the load-receiver with its true load the closer is opened in the manner hereinbefore set forth, the receiver, however, being limited against upward movement at this time by the action of the weighing-mechanism limiter hereinbefore described. After the load has been completely discharged from the receiver the closer shuts, thereby operating the arm 35 into position to engage the limiter and actuate the same to permit the receiver to continue its ascent to its normal position to receive another load.

The load-reducing controller 45 is shown as oscillatory, so that when the load-receiver descends with its overload and until such receiver reaches its poise position such arm will be in contact with the fixed arm 48 and so maintain the magnet in working condition. The poising of the load therefore determines the reduction by breaking the circuit and demagnetizing the magnet.

While I have shown the load-reducing means as involving the use of electricity, it is obvious that the application of electricity may also be used to facilitate the discharge of a load, especially in connection with sluggish material, when it is desired to hasten a discharge thereof by drawing the same from the load-receiver, although in the present machine and with the material shown it is deemed more desirable to effect such discharge by gravity.

Having described my invention, I claim—

1. In a rising-poise weighing-machine, the combination of a weighing instrumentality operative to receive and weigh material; an agent; electrical means for energizing said agent and thereby a portion of the material supplied to said weighing instrumentality, whereby said agent may act upon said material to reduce the load; and means for rendering the action of such agent ineffective on the poising of the load.

2. The combination of a weighing instrumentality operative to receive and weigh material; magnetic means operative to magnetize a part of the material supplied to said weighing instrumentality whereby said means may act upon such material to reduce the load; and means for rendering such magnetic means ineffective on the poising of the load.

3. In a machine of the class specified, the combination of weighing mechanism operative to receive and weigh material; electromagnetic means operative to magnetize a part of the material supplied to said weighing instrumentality to reduce the load; and means for rendering such electromagnetic means ineffective on the poising of the load.

4. In a rising-poise weighing-machine, the combination of a weighing instrumentality operative to receive and weigh material; an agent; electrical means for energizing said agent and thereby a portion of the material supplied to said weighing instrumentality, whereby said agent may act upon such material to reduce the load; and means for rendering said electrical means operative at one period and inoperative at another period, whereby said agent is rendered ineffective on the poising of the load.

5. The combination of a weighing instrumentality operative to receive and weigh material; magnetic means operative to magnetize a part of the material supplied to said weighing instrumentality, whereby said means may act upon said material to reduce the load; and means for rendering said magnetic means effective at a predetermined period and for rendering it ineffective on the poising of the load.

6. In a machine of the class specified, the combination of weighing mechanism operative to receive and weigh material; electromagnetic means operative to magnetize a part of the material supplied to said weighing instrumentality, whereby said means may act upon such material to reduce the load; and means for rendering said electromagnetic means effective at a predetermined period and for rendering it ineffective on the poising of the load.

7. In a rising-poise weighing-machine, the combination of a weighing instrumentality operative to receive and weigh material; an agent; electrical means for energizing said agent and thereby a portion of the material supplied to said weighing instrumentality, whereby said agent may act upon such material to reduce the load; means for rendering the action of such agent ineffective on the poising of the load; and means for limiting the return of such weighing instrumentality to its normal load-receiving position until the discharge of the poised load.

8. The combination of a weighing instrumentality operative to receive and weigh material; magnetic means operative to magnetize a part of the material supplied to said weighing instrumentality, whereby said means may act upon such material to reduce the load; means for rendering such magnetic means ineffective on the poising of the load; and means for limiting the return of said weighing instrumentality to its normal load-receiving position until the discharge of the poised load.

9. In a rising-poise weighing-machine, the combination of a weighing instrumentality operative to receive and weigh material; an agent; electrical means for energizing said agent and thereby a portion of the material supplied to said weighing instrumentality, whereby said agent may act upon such material to reduce the load; and means for rendering said electrical means operative and controlled in its operation by a part of said machine.

10. In a rising-poise weighing-machine, the combination of a weighing instrumentality operative to receive and weigh material; magnetic means operative to magnetize a part of the material supplied to said weighing instrumentality whereby said means may act upon such material to reduce the load; and means for rendering said magnetic means effective at one period, and for rendering it ineffective on the poising of the load and controlled in its operation by a part of said machine.

11. In a rising-poise weighing-machine, the combination of weighing mechanism operative to receive and weigh material; electromagnetic means operative to magnetize a part of the material supplied to said weighing mechanism, whereby said means may act upon such material to reduce the load; and means for rendering said electromagnetic means effective at a predetermined period and for rendering it ineffective on the poising of the load and controlled in its operation by a part of said weighing mechanism.

12. In a rising-poise weighing-machine, the combination of weighing mechanism having a load-receiver adapted to receive material and constituting the field of influence and operative to transfer a portion of such material from said field of influence into a field of non-influence, from whence its tendency is to pass again into said field of influence; an agent; electrical means for energizing said agent and thereby a portion of the material in said field of non-influence, whereby said agent may act upon the material in the field of non-influence and reduce the load; and means for rendering the action of such agent ineffective on the poising of the load.

13. In a machine of the class specified, the combination, with weighing mechanism, of overload-supply means, and an adjustable load-reducing means adjustable toward and from the material thereby to insure a greater or less effective action on the material, and operative to reduce the overload.

14. In a rising-poise weighing-machine, the combination of weighing mechanism having a load-receiver adapted to receive material and constituting the field of influence, and operative to pass a portion of said material from said field of influence into a field of non-influence, from whence its tendency is to pass again into said field of influence; magnetic means operative to magnetize a part of the material in the field of non-influence, whereby said means may act upon the material in said field of non-influence and reduce the load; and means for rendering such magnetic means ineffective on the poising of the load.

15. In a rising-poise weighing-machine, the combination of weighing mechanism having a load-receiver effective to transfer a portion of the material received thereby from one part thereof to another part thereof through a neutral region; electromagnetic means operative to magnetize a part of the material passing through said neutral region, whereby said means may act upon such material to reduce the load; and means for rendering such electromagnetic means ineffective on the poising of the load.

16. In a rising-poise weighing-machine, the combination of a weighing instrumentality; overload-supply means; stream-controlling means therefor; magnetic means operative to magnetize a part of the material supplied to said weighing instrumentality whereby said means may act on such material to reduce the load; means for rendering such magnetic means ineffective on the poising of the load; and load-discharging means.

17. The combination of weighing mechanism; load-supply means therefor; adjustable load-reducing means adjustable with relation to the material to be acted upon, and independently of the movement of the weighing mechanism, thereby to exert a greater or less effective action on said material, and operative to reduce the load supplied to said weighing mechanism; and load-discharging means.

18. The combination of weighing mechanism embodying a load-receiver having an opening at one side, a main load-receiving compartment, and a supplemental compartment terminating adjacent to said opening, and magnetic means for withdrawing material during its passage from said supplemental compartment and by said receiver-opening.

19. The combination of weighing mechanism embodying a load-receiver having an opening at one side, a main load-receiving compartment, a hopper terminating adjacent to said receiver-opening, a conduit communicating with said hopper and with said main compartment, and magnetic means for withdrawing material during its passage from said hopper into said conduit and by said receiver-opening.

20. In a weighing-machine, the combination of weighing mechanism operative to discharge a part of the load and to again receive a part of such discharged load, and electromagnetic means operative intermediate the discharge and reception of such material by said weighing mechanism to reduce the discharge of such material thereby to permit a lesser amount of material to be received by the weighing mechanism than is discharged therefrom.

21. In a weighing-machine, the combination, with framework, of weighing mechanism supported thereby; overload-supply means; and load-reducing means supported on said framework for sliding adjustment and comprising an electromagnet effective to magnetize the material to be reduced.

22. In a weighing-machine, the combination of weighing mechanism; overload-supply means; and load-reducing means supported for sliding movement and having a construction and operation whereby its adjustment will increase or lessen its effective action on the material to be reduced.

23. In a weighing-machine, the combination of weighing mechanism; overload-supply means; load-reducing means comprising an electromagnet effective to act directly on the material; and means carried by the weighing mechanism for controlling the operation of said load-reducing means.

24. In a weighing-machine, the combination of weighing mechanism embodying a load-receiver; overload-supply means therefor; load-reducing means comprising an electromagnet effective to act directly on the material; and means carried by the load-receiver for controlling said load-reducing means.

25. The combination, with framework, of weighing mechanism supported thereby and embodying a load-receiver; overload-supply means; load-reducing means comprising an electromagnet mounted on said framework; an electric circuit connected therewith, one end of which is secured to said framework; and means for making and breaking said circuit and comprising a controller carried by said load-receiver.

26. The combination, with framework, of weighing mechanism supported thereby and embodying a load-receiver; overload-supply means; load-reducing means comprising an electromagnet mounted on said framework; an electric circuit connected therewith, one end of which is secured to said framework; means for making and breaking said circuit and comprising a shiftable controller carried by said load-receiver and adapted to form contact with said framework; and load-discharging means.

27. In a weighing-machine, the combination, with framework, of weighing mechanism supported thereby; overload-supply means; and load-reducing means supported on said framework for sliding movement thereby to exert a greater or less effective action on the material.

28. The combination of weighing mechanism; load-supply means therefor; and adjustable load-reducing means free of rigid connection with said weighing mechanism and effective to reduce the load supplied thereto without the carriage of the material therefrom in a receptacle.

29. The combination of weighing mechanism embodying a load-receiver having an opening at one side thereof, a hopper, and a conduit into which said hopper opens; overload-supply means; load-reducing means disposed at the outer side of said receiver and adapted to act on the material discharged from said hopper into said conduit and, without contact therewith, deflect the same through said receiver-opening thereby to reduce the load; and load-discharging means.

30. In a weighing-machine, the combination of weighing mechanism embodying a load-receiver having an opening at one side thereof, a hopper, and a conduit into which said hopper discharges; load-reducing means comprising an electromagnet operative to attract the material discharged from said hopper, thereby to withdraw the same through said opening and reduce the load; and means for receiving the material withdrawn through said opening.

31. In a weighing-machine, the combination, with framework, of weighing mechanism supported thereby and embodying a load-receiver having an opening at one side thereof, a main compartment, a hopper, and a conduit communicating with said hopper and opening and with said main compartment; overload-supply means; load-reducing means comprising an electromagnet mounted on said framework and adjustable toward and from said opening; a contact connected with a battery; a wire leading from said battery to said electromagnet; a shiftable controller carried by said load-receiver; a wire connecting said controller with said magnet whereby when said arm is in engagement with said contact the electromagnet will be magnetized, and when out of engagement therewith will be demagnetized; and load-discharge means.

32. In a weighing-machine, the combination, with weighing mechanism including a load-receiver effective to receive and weigh material, of load-reducing means comprising an electromagnet, and means operative on the movement of said receiver for energizing the magnet whereby said magnet will attract a part of the material supplied to said weighing mechanism and thereby reduce the load.

33. In a weighing-machine, the combination of a weighing instrumentality; load-supply means therefor; and load-reducing means comprising a magnet effective to magnetize and thereby reduce the load and having a sliding adjustment.

34. In a weighing-machine, the combination, with overload-supply means, of weighing mechanism having during the weighing of a load a continuously-running stream of material; load-reducing means comprising an electromagnet; and means operative on the descent of said weighing mechanism for energizing the magnet, whereby said magnet will act on said running stream of material and attract the surplus constituting the overload of said weighing mechanism.

35. In a weighing-machine, the combination, with weighing mechanism, of overload-supply means therefor; load-reducing means comprising an electromagnet; and means operative to throw said magnet into and out of operation, and operative during the descent of said weighing mechanism for energizing the magnet, whereby said magnet will attract the surplus constituting the overload of said weighing mechanism.

FRANCIS H. RICHARDS.

Witnesses:
   C. A. WEED,
   F. N. CHASE.